(12) United States Patent
Culbert

(10) Patent No.: US 7,451,306 B2
(45) Date of Patent: *Nov. 11, 2008

(54) NETWORK SECURITY DEVICE

(75) Inventor: Patrick Culbert, Artarmon (AU)

(73) Assignee: Firebridge Systems Pty Ltd., Artarmon (AU)

( * ) Notice: Subject to any disclaimer, the term of this patent is extended or adjusted under 35 U.S.C. 154(b) by 692 days.

This patent is subject to a terminal disclaimer.

(21) Appl. No.: 10/474,856

(22) PCT Filed: Apr. 11, 2002

(86) PCT No.: PCT/AU02/00499

§ 371 (c)(1),
(2), (4) Date: Apr. 26, 2004

(87) PCT Pub. No.: WO02/084916

PCT Pub. Date: Oct. 24, 2002

(65) Prior Publication Data

US 2004/0172529 A1    Sep. 2, 2004

(30) Foreign Application Priority Data

Apr. 11, 2001    (AU) .................................... PR4355

(51) Int. Cl.
*H04L 9/00*    (2006.01)

(52) U.S. Cl. ........................................ 713/153; 726/13

(58) Field of Classification Search ....................... None
See application file for complete search history.

(56) References Cited

U.S. PATENT DOCUMENTS 5,884,025 A * 3/1999 Baehr et al. .................... 726/13

OTHER PUBLICATIONS

Liu, Jianbing and Ma, Yan, "Packet Filtering in Bridge", *IEEE Communications Society*, Internet Workshop 1999, pp. 94-98 (published Piscataway, NJ, 1999).

* cited by examiner

*Primary Examiner*—Pramila Parthasarathy
(74) *Attorney, Agent, or Firm*—Victor N. King; Speckman Law Group PLLC

(57) ABSTRACT

A network security device that does not require a separate computer for implementation is disclosed. The device may be in the form of a boxed hardware component and may be configured from an HTML interface. The device contains and uses three network cards. The first two cards are used for the firewall. A third card is a management interface having a private, non publicly routed IP address. A first network card forwards packets to a packet filter. Packets which pass the packet filter are then forwarded to a second network card and subsequently to their destination. None of the three network cards have a publicly routed IP address. The device acts as a packet filter that bridges rather than routes or proxies. The device may be connected between a router and a hub or a server machine.

10 Claims, 4 Drawing Sheets

NETWORK SECURITY DEVICE

FIELD OF INVENTION

The invention pertains to a network security device and more particularly to a firewall device using packet filtering and bridging.

BACKGROUND OF INVENTION

Many network services have been proven exploitable and network service tools have become widely available. Even without compromising any information, the temporary blackout of a server or network can mean many hours of lost work and missed business opportunities.

Companies connect to the Internet, and exchange data via dialup; ISDN and leased lines. Furthermore, employees are offered remote access options. However, every incoming connection is likely to have outgoing connections as well.

No computer network is completely secure. Like any lock, if it is built by a human being, it can be broken by a human being. A small security measure may prevent most amateurs from causing annoyances to the computer network. However, a major network should not settle for such small security measures.

Security is expensive. Dedicated hardware and software has to be purchased, installed, configured and maintained by either hiring, employing or creating expertise. Often changes have to be made to existing infrastructure requiring more hardware or causing downtime.

Glossary of Terms

Bridge
A device which forwards traffic between network segments based on data link layer information. These segments would have a common network layer address.

Firewall
A dedicated gateway machine having special security precautions. A firewall is used to service outside network, especially Internet connections and dial-in lines. The idea is to protect a cluster of more loosely administered machines hidden behind the firewall from hackers. The typical firewall is an inexpensive microprocessor-based unit machine that has modems and public network ports. The machine has one carefully monitored connection to the rest of the cluster and contains no critical data.

Router
A device which forwards packets between networks. The forwarding decision is based on network layer information and routing tables, often constructed by routing protocols.

Packets
The unit of data sent across a network. "Packet" is a generic term used to describe a unit of data at any layer of OSI protocol stack, but it is most correctly used to describe application later data units ("application protocol data unit", APDU).

Packet Filters
Every packet is compared against a rule base and a decision is executed based on the matching rule.

Rule Base
A set of rules which determines which packets to allow or disallow through a network.

HTML: Hypertext Markup Language
The language used to describe WWW pages.
A tag-based ASCII language that is used to specify the content and hypertext links to other documents on World Wide Web servers on the Internet. Browsers made for any operating system, (hardware platform, monitor resolution, etc.) can then be used to view the prepared documents and follow links to display other documents.

Network Interface Card (Network Card)
A name for the LAN Adaptor (printer circuit board) installed in a PC, that enables it to communicate over a LAN. The term is used commonly by IBM PC and token ring users.

IP Address
All network-layer protocols have an address format. For 32-bit IP addresses of the TCP/IP protocol, IP addresses are in the format of "199.12.1.1". This format is called dotted decimal, and each of the four sections is a decimal number from 0 to 255, representing 8 bits of the IP address that specifies a specific host on that network.

Since there are only 32 bits to the entire IP address and some networks have many more hosts than others (and there are fewer larger networks), there are different address classes. The different addresses allocate different numbers of bits to the network and the host portion of the address.

DMZ De-Militarised Zone
From the military term for an area between two opponents where fighting is prevented.
DMZ Ethernets connect networks and computers controlled by different bodies. They may be external or internal. External DMZ Ethernets link regional networks with routers to internal networks. Internal DMZ Ethernets link local nodes with routers to the regional networks.

Current Technology
Many different types of firewall and security software are known. They can be broken down to three categories. (We do not consider personal firewalls protecting a single home computer).

Proxy based: The firewall serves as an application-proxy between systems that physically connect to different network interfaces on the firewall server. An application-proxy acts as an agent or substitute at the application level for entities that reside on one side of the firewall when dealing with entities on another side of the firewall. By maintaining this separation between interfaces, and continuously protocol checking, the firewall provides a very secure environment. However, proxy based firewall is demanding on CPU time and may become an issue on high volume sites.

Stateful inspection: Whenever the firewall receives a packet initiating a connection, that packet is reviewed against the firewall rule base in sequential order. If the packet goes through any rule without being accepted, the packet is denied. If the connection is accepted, the session is then entered into the Firewall's stateful connection table, which is located in memory. Every packet that follows is then compared to the stateful inspection table. If the session is in the table, and the packet is part of that session, then the packet is accepted. If the packet is not part of the session then it is dropped. This improves system performance, as every single packet is not compared against the rule base.

Packet filters: Every packet is compared against the rule base and a decision is executed based on the matching rule or rules.

Most of the high-end firewalls provide combinations or hybrids of the above-mentioned techniques. All known examples have in common, that they are technically routers and need to have different subnets on each network interface.

Router vs. Bridge

A router is a device that forwards packets between networks. The router is aware of different networks and how to communicate to the networks. This is the technique currently used by all known commercial firewalls. This implies that hosts on a different side of the firewall have to have a different network address, as the traffic will otherwise never end up at the firewall. This technique requires changes to the network's dial-in device and the LAN.

A bridge is a device that forwards traffic between network segments based on data link layer information. The bridge functions based on the MAC address.

The present invention emerged from a real life situation where a company wanted to protect their dial-in server. The dial-in server provided network connectivity for employees and third parties. However, the company had an insecure Internet connection and a new third part needed access to the company's computer system.

Implementing any sort of conventional firewall would have meant reconfiguring the addressing-scheme of the dial-in server and coordinating changes with the remote companies.

It would therefore be desirable to provide a network security device that effectively protects a computer network system and does not require the implementation of the existing firewall.

SUMMARY OF THE INVENTION

Accordingly, there is a need for a security device which requires no changes to an existing infrastructure. There is also a need for a fully transparent firewall. The systems of the present invention will never show in a trace route, as it is not a logical part of the network. Further, the invention may be implemented without assigning an IP address to it. The invention allows console access for configuration but results in a security device without an IP address.

The present invention provides a network security device that does not require a separate computer to implement. The device may be configured from an HTML interface and may use three network cards. The first two cards are used for the Firewall. A third card is a management interface that has a private, non-publicly routed IP address. The first network card forwards packets to a packet filter. Packets which pass the filter are forwarded to the second network card and subsequently to their destination. None of these cards have a publicly routed IP address. The device acts as a packet filter which bridges rather than routes or proxies. The device may be integrally connected in between a router and a hub or server machine.

BRIEF DESCRIPTION OF THE DRAWINGS

The present invention will be described in greater detail in the following detailed description, with reference to the accompanying drawings, wherein.

DETAILED DESCRIPTION OF THE INVENTION

Implementation of the invention requires, for example:

Hardware
Minimum 200 Mhz Processor
Min 64 MB RAM
One solid-state hard drive of 64 MB Capacity
3× Network Cards 10/100/1000
Case with power supply and LCD panel with input device for system configuration. Serial port for debugging and startup information as we do not use a video card.

Software
Linux Kernel Version 2.2.20
Apache Web Server 1.3.22 mod_perl mod_SSL
Perl Version 5.6.1
OpenSSH+OpenSSL
GNU Tools and utilities needed for running SYS V Linux OS
Web Interface using mod_perl, HTML and CSS Installation is accomplished by creating a computer using the hardware listed in the "Hardware" section above. A detailed system build description can be found in appendix A.

Figure 4:
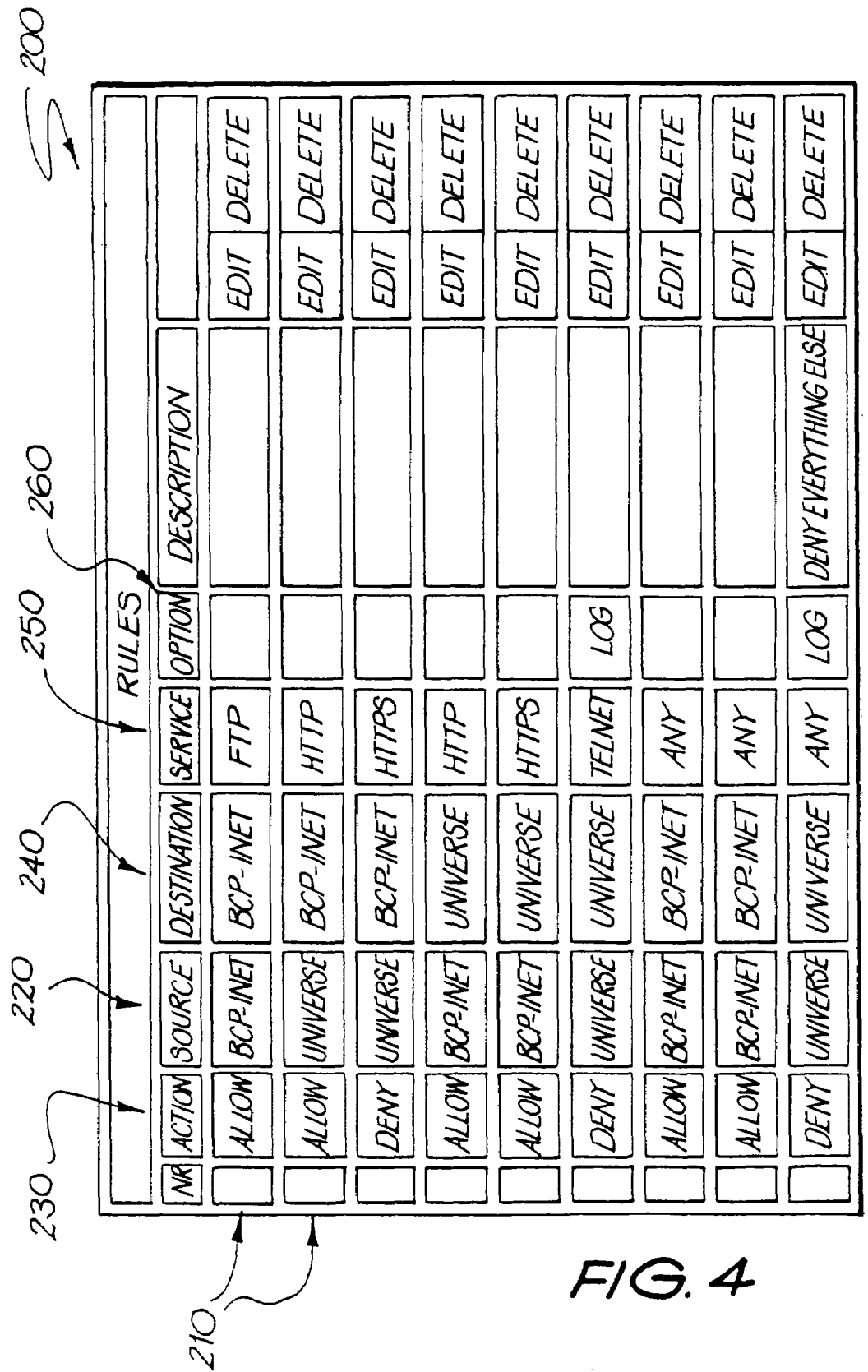
FIG. 4 is an illustration of the graphical user interface which provides a user with editorial control over a packet filtering rule set.

As shown in FIG. 4, the invention comprises a configuration interface, which include two parts:
Firewall Configuration
System Monitoring Firewall Configuration
1. The interface 10, uses plain text configuration files 20, manipulated through a CGI 50, that contain the ruleset.
2. The configuration files are manipulated by Perl scripts that are accessed through an HTML interface.
3. The configuration files are then translated 30 into the kernel rules 40 by Perl scripts.

A detailed configuration description can be found in appendix B.

System Monitoring
1. Monitors LOAD status. This will tell the users what the current load on the CPU is.
2. Monitors Disk Space Status. This will tell the users what the current level of Disk Space Usage is.
3. Monitors CONFIGURATION status. This will tell the users whether or not the changes they have made to the configuration of the firewall have been committed to the firewall.
4. Monitors and Logs whether or not packets have been allowed or denied.

Figure 1:
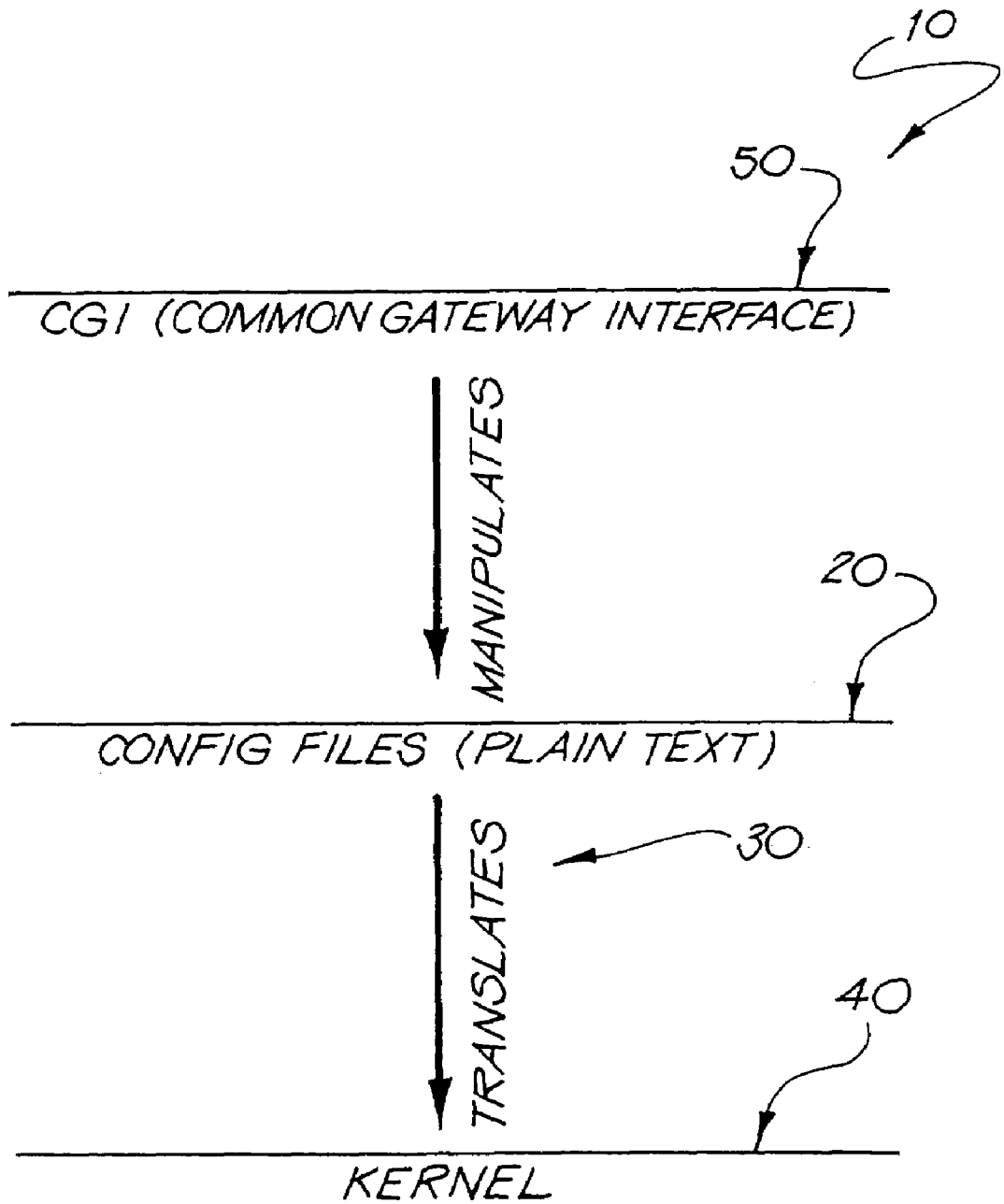
FIG. 1 is a flow chart illustrating how the system of the present invention is configured.
Figure 2:
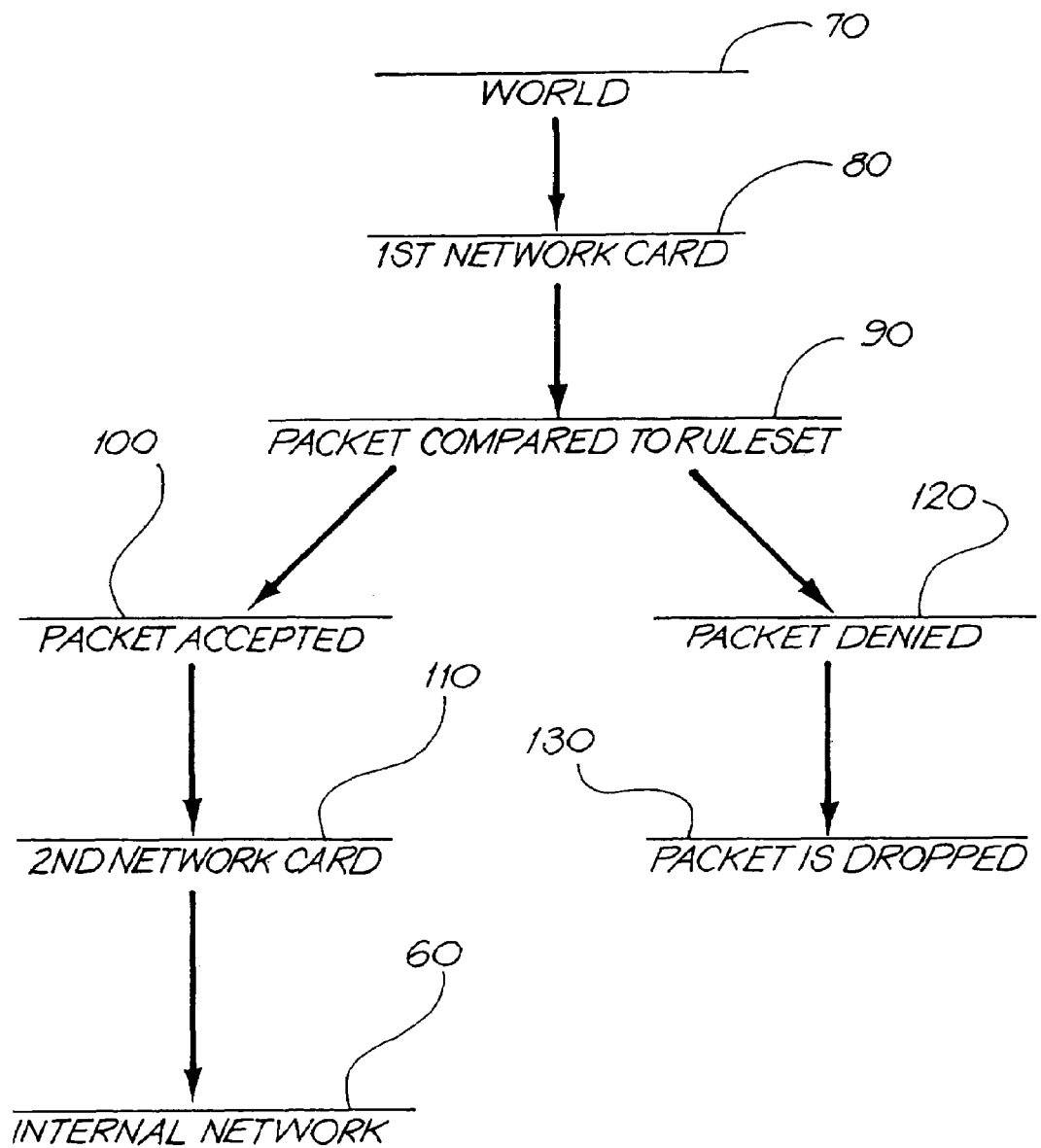
FIG. 2 is a flow chart illustrating how network traffic enters an internal network through the system of the present invention.

As shown in FIG. 2, the inward flow of information comprises a flow of packets. A packet comes into the network 60 from the world 70. The packet then passes through a first network card 80. The packet is then inspected by a packet filter 90 and compared to a rule set. If the packet is accepted 100 it will then be forwarded to a second network card 110. From the second network card 110, the packet arrives to an internal network 60. If the packet is denied 120 it will then be dropped 130. A packet disappears when it is dropped 130. The status of the dropped packet 130 may be recorded by a log.

Figure 3:
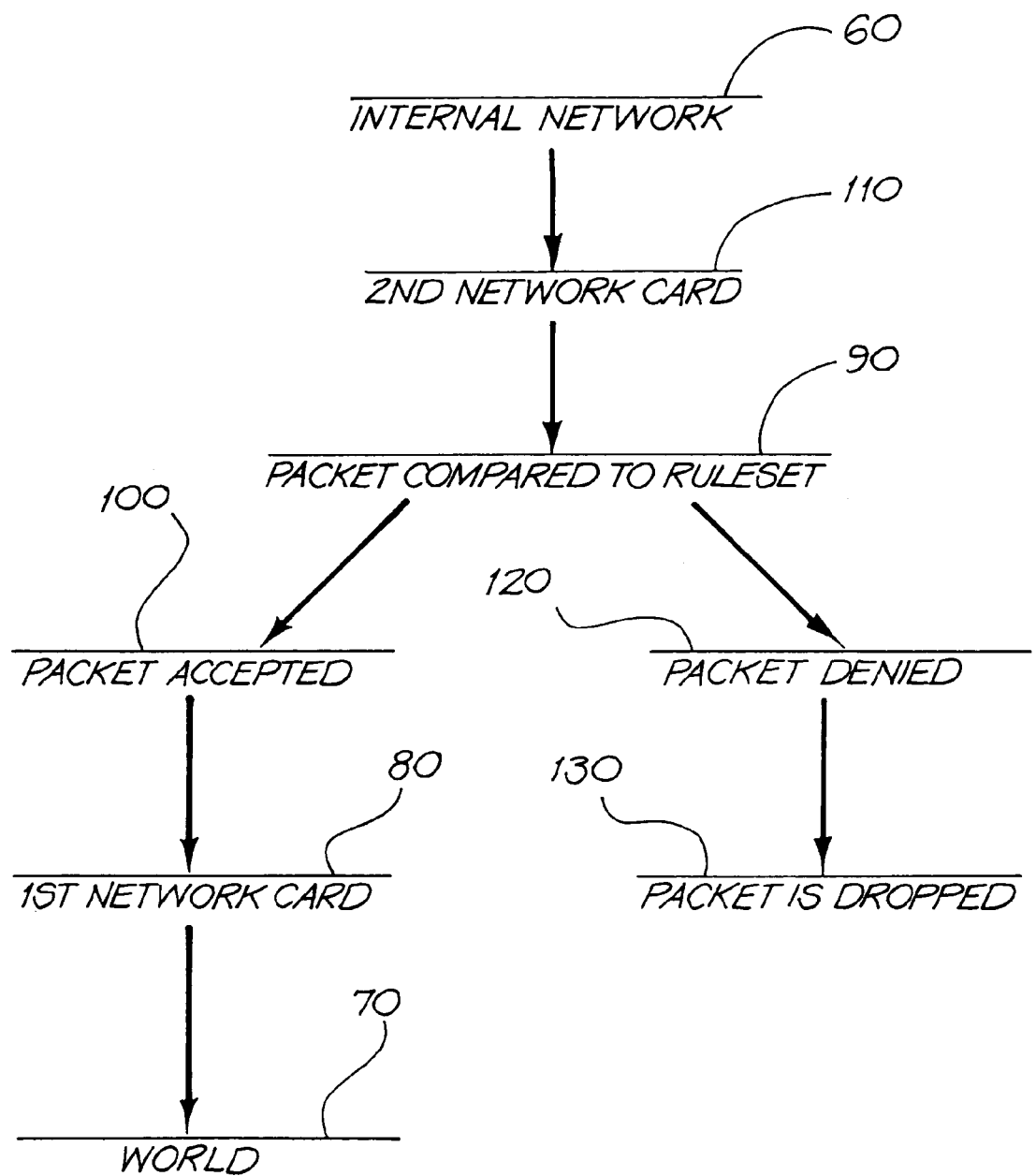
FIG. 3 is a flow chart illustrating how internal network traffic passes through the system of the present invention into the external world.

As shown in FIG. 3, an outbound packet goes out to the world 70 from the network 60. The outbound packet passes through the second network card 110. The packet is then inspected by the packet filter 90 and compared to the rule set 90. The packet, if accepted, may be forwarded to the world 70 via the first network card 80. The packet may be dropped and disappears if it is denied 120 by the rule set 90. Under this system, the status of the dropped packet 130 may also be recorded by a log.

The following table compares the features of the present invention to two other commercial products.

| Present Invention | FireBox II ™ | Firewall I ™ & Raptor ™ |
|---|---|---|
| 1. All-in-One Network Security Device that requires no other devices to protect a network or segment of a network | All-in-One Network Security Device that requires no other devices to protect a network or segment of a network | Software Based Network Security Device Require: Extra Hardware (a computer) & Extra Software (an operating system) |
| 2. HTML Interface for Configuration which means that it can be configured from any computer that has a browser without installing any additional software | HTML Interface for Configuration which means that it can be configured from any computer that has a browser without installing any additional software | Uses its own Interface for configuration which means that it can only be configured from a computer that has the software installed on it. |
| 3. Uses 3 Network Cards-Management Interface with dummy internal IP address No IP Address No IP Address | Uses 3 Network Cards DMZ Local Internet | Uses at least 2 Network Cards. Can uses as many as supported by hardware and OS combination. Internal External |
| 4. Requires No IP Addresses on the protected segments | Requires Multiple Relevant IP Addresses | Requires Multiple Relevant IP Addresses |
| 5. Uses Packet Filtering Firewall Technology | Uses Packet Filtering Firewall Technology | Uses Stateful inspection and proxy Firewall Technology |
| 6. Checks Packet and then Bridges it (Completely Transparent) | Checks Packet and then Routes it | Checks Packet and then Routes it |

Firewall I and Raptor require a separate computer with an operating system before they can run and is therefore very different to the other two firewalls. The present invention uses 3 Network Cards:

Management Interface with Dummy Internal IP Address

This Network Card is only used to configure the firewall. It is not used in the operation of the firewall in any way and has no IP address. The other two network cards 80, 110, as shown in FIGS. 2 and 3, do not have IP addresses assigned to them.

The greatest difference between the present invention and any known Firewall on the market is that the network cards 80, 110 of the present invention are not assigned with IP addresses while other Firewalls are assigned with IP addresses. Because the present inventive solution does not use IP addresses, an IP address is not a logical part of the network. According to the network security device of the present invention, an IP address cannot be detected and a network may be implemented simply by disconnecting an existing interface and connecting the network security device in between the world 70 and the network 60. No other network reconfiguration is required. This system is completetly unique when compared to other devices and systems in the market.

The Firebox™ uses 3 Network Cards and requires 3 relevant IP addresses. This means that the Network needs to be reconfigured to allow for the installation of this product. Firewall I™ and Raptor™ use 2 Network Cards and require 2 relevant IP addresses. This means that the Network needs to be reconfigured to allow installation of these products.

The present invention checks a packet and then bridges it, which is completely transparent. The Firebox™ checks a packet and then routes it. Firewall I™ and Raptor™ check the packet and then route it. Raptor™ checks the requests and then proxies it. All three firewalls check a packet. One significant difference is that the present invention will bridge it rather than route it.

As shown in FIG. 4, a rule set 90 may be edited through a graphical user interface 200. All rules 210 are given an order that may be modified at any time. The rules 210 are checked by the computer, one at a time, in order. A packet may be actioned 230 if it, otherwise the packet will go to a default rule. The rule set tabs into account of a packet source 220, a destination 240, a relevant service 250 and options 260, such as logging requirements. Graphical buttons 270, 280 easy easily aid user editing or deletion.

Appendix A

Embedded System Build Description:

The reason for having an embedded Linux system is to take away any administrative overhead for the user who might not be familiar with the Linux operating system. Furthermore we eliminate issues like file system corruption when the system is powered off rather then shut down properly.

We use a separate machine to build the OS. This system contains a development environment, which allows us to build the necessary binaries, and shared libraries for our production machine.

On the build machine a separate partition exists which emulates the final destination of the OS (the solid state drive).

The following root directory structure is created:

| | |
|---|---|
| /bin | (system binaries) |
| /boot | (kernel directory) |
| /dev | (device character devices) |
| /etc | (configuration files) |
| /home | (home directories) |
| /lib | (share libraries) |
| /proc | (proc filesystem mount point) |
| /root | (root home directory) |
| /sbin | (system binaries) |
| /tmp | (tmp space mount point) |
| /usr | (usr libraries and binaries) |
| /var | (var mount point) |

We populate the /dev directory with the following required character files:

| | | | |
|---|---|---|---|
| crw------- | 1 root | root | 5, 1 Apr 9 14:34 console |
| crw------- | 1 root | root | 5, 64 Feb 26 16:52 cua0 |
| crw------- | 1 root | root | 5, 65 Feb 26 16:52 cua1 |
| brw-rw---- | 1 root | disk | 3, 0 Feb 26 16:52 hda |
| brw-rw---- | 1 root | disk | 3, 1 Feb 26 16:52 hda1 |
| brw-rw---- | 1 root | root | 3, 2 Feb 26 16:52 hda2 |
| brw-rw---- | 1 root | disk | 3, 3 Feb 26 16:52 hda3 |
| brw-rw---- | 1 root | disk | 3, 4 Feb 26 16:52 hda4 |
| brw-rw---- | 1 root | disk | 3, 5 Feb 26 16:52 hda5 |
| brw-rw---- | 1 root | disk | 3, 6 Feb 26 16:52 hda6 |
| brw-rw---- | 1 root | disk | 3, 7 Feb 26 16:52 hda7 |
| brw-rw---- | 1 root | disk | 3, 8 Feb 26 16:52 hda8 |
| crw------- | 1 root | sys | 89, 0 Feb 26 16:52 i2c0 |
| crw------- | 1 root | sys | 89, 1 Feb 26 16:52 i2c1 |
| prw------- | 1 root | root | 0 Apr 4 19:54 initctl |
| crw-r----- | 1 root | kmem | 1, 2 Feb 26 16:52 kmem |
| crwxrwxr-x | 1 root | www | 10, 140 Feb 26 16:52 led |
| srw-rw-rw- | 1 root | root | 0 Apr 9 14:34 log |
| crw-r----- | 1 root | kmem | 1, 1 Feb 26 16:52 mem |
| crw-rw-rw- | 1 root | root | 1, 3 Feb 26 16:52 null |
| crw-r----- | 1 root | kmem | 1, 4 Feb 26 16:52 port |
| crw-rw-rw- | 1 root | root | 5, 2 Apr 10 12:53 ptmx |
| drwxr-xr-x | 2 root | root | 0 Apr 9 14:34 pts |
| brw------- | 1 root | disk | 1, 0 Feb 26 16:52 ram0 |
| brw-rw---- | 1 root | disk | 1, 1 Feb 26 16:52 ram1 |
| brw-rw---- | 1 root | disk | 1, 2 Feb 26 16:52 ram2 |
| brw-rw---- | 1 root | disk | 1, 3 Feb 26 16:52 ram3 |
| brw-rw---- | 1 root | disk | 1, 4 Feb 26 16:52 ram4 |
| crw-r--r-- | 1 root | root | 1, 8 Feb 26 16:52 random |
| crw-rw-r-- | 1 root | root | 10, 135 Feb 26 16:52 rtc |
| lrwxrwxrwx | 1 root | root | 17 Mar 18 21:09 stderr -> . . . /proc/self/fd/2 |
| lrwxrwxrwx | 1 root | root | 17 Mar 18 21:09 stdin -> . . . /proc/self/fd/0 |
| lrwxrwxrwx | 1 root | root | 17 Mar 18 21:09 stdout -> . . . /proc/self/fd/1 |
| crw------- | 1 root | root | 4, 0 Feb 26 16:52 systty |
| crw-rw-rw- | 1 root | root | 5, 0 Mar 18 20:50 tty |
| crw------- | 1 root | tty | 4, 0 Feb 26 16:52 tty0 |
| crw------- | 1 root | try | 4, 1 Feb 26 16:52 tty1 |
| crw------- | 1 root | tty | 4, 2 Feb 26 16:52 tty2 |
| crw------- | 1 root | tty | 4, 3 Feb 26 16:52 tty3 |
| crw------- | 1 root | tty | 4, 4 Feb 26 16:52 tty4 |
| crw------- | 1 root | tty | 4, 5 Feb 26 16:52 tty5 |
| crw------- | 1 root | tty | 4, 6 Feb 26 16:52 tty6 |
| crw------- | 1 root | tty | 4, 7 Feb 26 16:52 tty7 |
| crw------- | 1 root | tty | 4, 8 Feb 26 16:52 tty8 |
| crw------- | 1 uucp | uucp | 4, 64 Apr 9 14:34 ttyS0 |
| crw-r----- | 1 root | tty | 4, 65 Feb 26 16:52 ttyS1 |
| crw-r--r-- | 1 root | root | 1, 9 Feb 26 16:52 urandom |
| crw-r--r-- | 1 root | root | 10, 130 Feb 26 16:52 watchdog |
| crw-rw-rw- | 1 root | root | 1, 5 Feb 26 16:52 zero |

We use Linux kernel 2.2.20 (www.kernel.org) enhanced with the OW security patches (www.openwall.com). We replace the existing kernel bridging code with the 2.4 kernel code (bridge.sourceforge.net).

The kernel is configured with the following parameters:
```

# Automatically generated by make menuconfig: don't edit

CONFIG_X86=y

# Code maturity level options

CONFIG_EXPERIMENTAL=y

# Processor type and features

# CONFIG_M386 is not set
# CONFIG_M486 is not set
# CONFIG_M586 is not set
CONFIG_M586TSC=y
# CONFIG_M686 is not set
CONFIG_X86_WP_WORKS_OK=y
CONFIG_X86_INVLPG=y
CONFIG_X86_BSWAP=y
CONFIG_X86_POPAD_OK=y
CONFIG_X86_TSC=y
# CONFIG_MICROCODE is not set
# CONFIG_X86_MSR is not set
# CONFIG_X86_CPUID is not set
CONFIG_1GB=y
# CONFIG_2GB is not set
# CONFIG_MATH_EMULATION is not set
CONFIG_MTRR=y
# CONFIG_SMP is not set

# Loadable module support
CONFIG_MODULES=y
# CONFIG_MODVERSIONS is not set
CONFIG_KMOD=y

# General setup

CONFIG_NET=y
CONFIG_PCI=y
# CONFIG_PCI_GOBIOS is not set
CONFIG_PCI_GODIRECT=y
# CONFIG_PCI_GOANY is not set
CONFIG_PCI_DIRECT=y
CONFIG_PCI_QUIRKS=y
# CONFIG_PCI_OPTIMIZE is not set
CONFIG_PCI_OLD_PROC=y
# CONFIG_MCA is not set
# CONFIG_VISWS is not set
CONFIG_COBALT_GEN_III=y
# CONFIG_COBALT_GEN_V is not set
# CONFIG_COBALT_BOOTLOADER is not set
CONFIG_SYSVIPC=y
# CONFIG_BSD_PROCESS_ACCT is not set
CONFIG_SYSCTL=y
CONFIG_BINFMT_AOUT=m
CONFIG_BINFMT_ELF=y
# CONFIG_BINFMT_ELF_AOUT is not set
CONFIG_BINFMT_MISC=m
# CONFIG_BINFMT_JAVA is not set
# CONFIG_PARPORT is not set
# CONFIG_APM is not set
# CONFIG_TOSHIBA is not set

# Plug and Play support

CONFIG_PNP=y

# Block devices

# CONFIG_BLK_DEV_FD is not set
CONFIG_BLK_DEV_IDE=y
# CONFIG_BLK_DEV_HD_IDE is not set
CONFIG_BLK_DEV_IDEDISK=y
# CONFIG_BLK_DEV_IDECD is not set
# CONFIG_BLK_DEV_IDETAPE is not set
# CONFIG_BLK_DEV_IDEFLOPPY is not set
# CONFIG_BLK_DEV_IDESCSI is not set
# CONFIG_BLK_DEV_CMD640 is not set
# CONFIG_BLK_DEV_RZ1000 is not set
CONFIG_BLK_DEV_IDEPCI=y
CONFIG_BLK_DEV_IDEDMA=y
# CONFIG_BLK_DEV_OFFBOARD is not set
```

```
CONFIG_IDEDMA_AUTO=y
# CONFIG_BLK_DEV_OPT1621 is not set
CONFIG_BLK_DEV_ALI15X3=y
# CONFIG_BLK_DEV_TRM290 is not set
# CONFIG_BLK_DEV_NS87415 is not set
# CONFIG_BLK_DEV_VIA82C586 is not set
# CONFIG_BLK_DEV_CMD646 is not set
# CONFIG_BLK_DEV_CS5530 is not set
# CONFIG_IDE_CHIPSETS is not set
# CONFIG_BLK_DEV_LOOP is not set
# CONFIG_BLK_DEV_NBD is not set
# CONFIG_BLK_DEV_MD is not set
CONFIG_BLK_DEV_RAM=n
CONFIG_BLK_DEV_RAM_SIZE=4096
# CONFIG_BLK_DEV_XD is not set
# CONFIG_BLK_DEV_DAC960 is not set
CONFIG_PARIDE_PARPORT=y
# CONFIG_PARIDE is not set
# CONFIG_BLK_CPQ_DA is not set
# CONFIG_BLK_CPQ_CISS_DA is not set
# CONFIG_BLK_DEV_HD is not set

# Networking options

CONFIG_PACKET=y
CONFIG_NETLINK=y
# CONFIG_RTNETLINK is not set
CONFIG_NETLINK_DEV=y
CONFIG_FIREWALL=y
# CONFIG_FILTER is not set
CONFIG_UNIX=y
CONFIG_INET=y
# CONFIG_IP_MULTICAST is not set
# CONFIG_IP_ADVANCED_ROUTER is not set
# CONFIG_IP_PNP is not set
CONFIG_IP_FIREWALL=y
# CONFIG_IP_FIREWALL_NETLINK is not set
# CONFIG_IP_TRANSPARENT_PROXY is not set
# CONFIG_IP_MASQUERADE is not set
# CONFIG_IP_ROUTER is not set
# CONFIG_NET_IPIP is not set
# CONFIG_NET_IPGRE is not set
CONFIG_IP_ALIAS=y
CONFIG_SYN_COOKIES=y
# CONFIG_INET_RARP is not set
CONFIG_SKB_LARGE=y
# CONFIG_IPV6 is not set
# CONFIG_IPX is not set
# CONFIG_ATALK is not set
CONFIG_BRIDGE=n
# CONFIG_X25 is not set
# CONFIG_LAPB is not set
# CONFIG_NET_DIVERT is not set
# CONFIG_LLC is not set
# CONFIG_ECONET is not set
# CONFIG_WAN_ROUTER is not set
# CONFIG_NET_FASTROUTE is not set
# CONFIG_NET_HW_FLOWCONTROL is not set
# CONFIG_CPU_IS_SLOW is not set

# QoS and/or fair queueing

# CONFIG_NET_SCHED is not set

# Telephony Support

# CONFIG_PHONE is not set
# CONFIG_PHONE_IXJ is not set

# SCSI support

# CONFIG_SCSI is not set

# I2O device support

# CONFIG_I2O is not set
# CONFIG_I2O_PCI is not set
# CONFIG_I2O_BLOCK is not set
# CONFIG_I2O_SCSI is not set

# Network device support

CONFIG_NETDEVICES=y

# ARCnet devices

# CONFIG_ARCNET is not set
# CONFIG_DUMMY is not set
# CONFIG_BONDING is not set
# CONFIG_EQUALIZER is not set
# CONFIG_ETHERTAP is not set
# CONFIG_NET_SB1000 is not set

# Ethernet (10 or 100 Mbit)

CONFIG_NET_ETHERNET=y
CONFIG_NET_VENDOR_3COM=y
# CONFIG_EL1 is not set
# CONFIG_EL2 is not set
# CONFIG_ELPLUS is not set
# CONFIG_EL16 is not set
# CONFIG_EL3 is not set
# CONFIG_3C515 is not set
CONFIG_VORTEX=y
# CONFIG_LANCE is not set
# CONFIG_NET_VENDOR_SMC is not set
# CONFIG_NET_VENDOR_RACAL is not set
# CONFIG_RTL8139 is not set
# CONFIG_RTL8139TOO is not set
# CONFIG_NET_ISA is not set
CONFIG_NET_EISA=y
# CONFIG_PCNET32 is not set
# CONFIG_ADAPTEC_STARFIRE is not set
# CONFIG_AC3200 is not set
# CONFIG_APRICOT is not set
# CONFIG_LP486E is not set
# CONFIG_CS89x0 is not set
# CONFIG_DM9102 is not set
# CONFIG_DE4X5 is not set
# CONFIG_DEC_ELCP is not set
# CONFIG_DEC_ELCP_OLD is not set
# CONFIG_DGRS is not set
CONFIG_EEXPRESS_PRO100=y
# CONFIG_LNE390 is not set
# CONFIG_NE3210 is not set
# CONFIG_NE2K_PCI is not set
# CONFIG_TLAN is not set
# CONFIG_VIA_RHINE is not set
# CONFIG_SIS900 is not set
# CONFIG_ES3210 is not set
# CONFIG_EPIC100 is not set
# CONFIG_ZNET is not set
# CONFIG_NET_POCKET is not set

```

```
# Ethernet (1000 Mbit)

# CONFIG_ACENIC is not set
# CONFIG_HAMACHI is not set
# CONFIG_YELLOWFIN is not set
# CONFIG_SK98LIN is not set
# CONFIG_FDDI is not set
# CONFIG_HIPPI is not set
# CONFIG_PPP is not set
# CONFIG_SLIP is not set
# CONFIG_NET_RADIO is not set

# Token ring devices

# CONFIG_TR is not set
# CONFIG_NET_FC is not set
# CONFIG_RCPCI is not set
# CONFIG_SHAPER is not set

# Wan interfaces

# CONFIG_HOSTESS_SV11 is not set
# CONFIG_COSA is not set
# CONFIG_SEALEVEL_4021 is not set
# CONFIG_SYNCLINK_SYNCPPP is not set
# CONFIG_LANMEDIA is not set
# CONFIG_COMX is not set
# CONFIG_HDLC is not set
# CONFIG_DLCI is not set
# CONFIG_XPEED is not set
# CONFIG_SBNI is not set

# Amateur Radio support

# CONFIG_HAMRADIO is not set

# IrDA (infrared) support

# CONFIG_IRDA is not set

# ISDN subsystem

# CONFIG_ISDN is not set

# Old CD-ROM drivers (not SCSI, not IDE)

# CONFIG_CD_NO_IDESCSI is not set

# Character devices

CONFIG_VT=y
CONFIG_VT_CONSOLE=y
CONFIG_SERIAL=y
CONFIG_SERIAL_CONSOLE=y
# CONFIG_SERIAL_EXTENDED is not set
# CONFIG_SERIAL_NONSTANDARD is not set
CONFIG_UNIX98_PTYS=y
CONFIG_UNIX98_PTY_COUNT=256
# CONFIG_MOUSE is not set

# Joysticks

# CONFIG_JOYSTICK is not set
# CONFIG_QIC02_TAPE is not set
CONFIG_WATCHDOG=y

# Watchdog Cards

# CONFIG_WATCHDOG_NOWAYOUT is not set
# CONFIG_ACQUIRE_WDT is not set
# CONFIG_ADVANTECH_WDT is not set
# CONFIG_PCWATCHDOG is not set
# CONFIG_1810_TCO is not set
# CONFIG_MIXCOMWD is not set
# CONFIG_60XX_WDT is not set
CONFIG_SOFT_WATCHDOG=m
# CONFIG_WDT is not set
# CONFIG_WDTPCI is not set
# CONFIG_MACHZ_WDT is not set
# CONFIG_NVRAM is not set
CONFIG_RTC=y
# CONFIG_INTEL_RNG is not set
# CONFIG_AGP is not set
# CONFIG_DRM is not set
CONFIG_COBALT_LCD=y

# Video For Linux

CONFIG_VIDEO_DEV=m
# CONFIG_RADIO_RTRACK is not set
# CONFIG_RADIO_RTRACK2 is not set
# CONFIG_RADIO_AZTECH is not set
# CONFIG_RADIO_CADET is not set
# CONFIG_RADIO_GEMTEK is not set
# CONFIG_RADIO_MAESTRO is not set
# CONFIG_RADIO_MIROPCM20 is not set
# CONFIG_RADIO_TRUST is not set
# CONFIG_VIDEO_BT848 is not set
# CONFIG_VIDEO_CPIA is not set
# CONFIG_VIDEO_PMS is not set
# CONFIG_VIDEO_SAA5249 is not set
# CONFIG_RADIO_SF16FMI is not set
# CONFIG_RADIO_TYPHOON is not set
# CONFIG_RADIO_ZOLTRIX is not set
# CONFIG_VIDEO_ZORAN is not set
# CONFIG_VIDEO_BUZ is not set
# CONFIG_DTLK is not set

# Ftape, the floppy tape device driver

# CONFIG_FTAPE is not set

# USB support

# CONFIG_USB is not set

# Filesystems

# CONFIGQUOTA is not set
# CONFIG_AUTOFS_FS is not set
# CONFIG_ADFS_FS is not set
# CONFIG_AFFS_FS is not set
# CONFIG_HFS_FS is not set
# CONFIG_FAT_FS is not set
# CONFIG_MSDOS_FS is not set
# CONFIG_UMSDOS_FS is not set
# CONFIG_VFAT_FS is not set
# CONFIG_IS09660_FS is not set
# CONFIG_JOLIET is not set
# CONFIG_MINIX_FS is not set
# CONFIG_NTFS_FS is not set
# CONFIG_HPFS_FS is not set
CONFIG_PROC_FS=y
CONFIG_DEVPTS_FS=y
```

```
# CONFIG_QNX4FS_FS is not set
# CONFIG_ROMFS_FS is not set
CONFIG_EXT2_FS=y
# CONFIG_SYSV_FS is not set
# CONFIG_UFS_FS is not set
# CONFIG_EFS_FS is not set

# Network File Systems

# CONFIG_CODA_FS is not set
# CONFIG_NFS_FS is not set
# CONFIG_NFSD is not set
# CONFIG_SUNRPC is not set
# CONFIG_LOCKD is not set
# CONFIG_SMB_FS is not set
# CONFIG_NCP_FS is not set

# Partition Types

# CONFIG_BSD_DISKLABEL is not set
# CONFIG_MAC_PARTITION is not set
# CONFIG_MNIX_SUBPARTITION is not set
# CONFIG_SMD_DISKLABEL is not set
# CONFIG_SOLARIS_X86_PARTITION is not set
# CONFIG_UNIXWARE_DISKLABEL is not set
# CONFIG_NLS is not set

# Console drivers

# CONFIG_VGA_CONSOLE is not set
# CONFIG_VIDEO_SELECT is not set
# CONFIG_MDA_CONSOLE is not set
# CONFIG_FB is not set

# Sound

# CONFIG_SOUND is not set

# Security options

# CONFIG_SECURE_STACK is not set
# CONFIG_SECURE_LINK is not set
# CONFIG_SECURE_FIFO is not set
# CONFIG_SECURE_PROC is not set
# CONFIG_SECURE_FD_0_1_2 is not set
# CONFIG_SECURE_RLIMIT_NPROC is not set
# CONFIG_SECURE_SHM is not set

# Kernel hacking

# CONFIG_MAGIC_SYSRQ is not set
```

The production kernel may be built and placed on the destination partition in the /boot directory. Supporting binaries are then built as needed in order to get a functional SYS V Linux system, web server and any other tools as desired. The built binaries are placed on the destination partition along with their required shared libraries and configuration files. The following set up is used once all the required functional binaries are built.

The following ram drives were generated during the boot process. The ram drives are used by the system for write operations. RAM is volatile and the shutdown sequence may take care of storing any information which needs to be available after a reboot or power outage. Since each RAM drive is created and formatted on startup there is no chance for file system corruption upon unclean shutdowns.

| Drive | Mounted as |
|---|---|
| /dev/ram0 | swap |
| /dev/ram1 | /tmp |
| /dev/ram2 | /var |
| /dev/ram3 | /usr/local/firebridge/http | swap: used by the OS when physical RAM is running low. (By generating swap space in RAM we reserve that part of memory for swap usage.

/tmp: Used for temporary files by the management interface

/var: used for logging (note that logfiles will currently not be saved upon reboot. In order to achieve permanent logging we provide syslog which can log to a loghost)

/usr/ . . . /http: Used for the webserver's web pages and graphics. In order to achieve fast access and increase interface performance we serve these graphics from RAM as access times are much higher then from any other device.

Appendix B

Management Interface and Firewall Configuration Files:

The CGI interface uses mod_perl and distinguishes between two types of files. *.cgi files which deal with what the user sees in the webbrowser. *-lib.pl files which contain functions for checking user input and manipulating the configuration files. There are static html files, images and cascading stylesheets used as a framework for the dynamic content and presentation.

The following files are used to manipulate the configuration files:

```
/
- fb-cgilib.pl       (general functions used by all scripts)
- ipcalc-lib.pl (ip calculator library)
- ipcalc.cgi         (ip calculator presentation)
* bridgeview         (this contains the read only versions)
    - vwgroups.cgi
    - vwnetobjects.cgi
    - vwrules.cgi
    - vwservices.cgi
* fw
    - fwconf-lib.pl (write ipchains compatible config based on rules)
    - fwconf.cgi     (activate/roll back configuration)
    - groups-lib.pl (manipulategroup file)
    - groups.cgi     (presentation for group file)
    - netobjects-lib.pl (manipulate network objects file)
    - netobjects.cgi (presentation for network objects file)
    - rules-lib.pl   (manipulate rules file)
    - rules.cgi      (presentation for rules file)
    - services-lib.pl (manipulate services file)
    - services.cgi   (presentation for services file)
* logvw
    - logvw.cgi      (view current log file)
* options
    - fbgconf-lib.pl (manipulate global configuration options)
    - fbgconf.cgi    (presentation global configuration options)
* status
    - confstatus.cgi (check if current configuration is identical
                      to active)
    - loadstanis.cgi (check the load of the box)
* wizard
    - wizard.cgi     (step by step creation of rules and related
                      objects)
```

Firebridge uses the following configuration files:

| | | |
|---|---|---|
| Actions | (Possible actions for a rule) | |
| nr:action | | |
| fbgcfg | (Global configuration options) | |
| option=value | (true or false) | |
| fbrules (rules by number) | | |
| nr:allow/deny:source-name:destination-name:service-name: | | |
| action-nr:comment | | |
| (note that source/destination/service can be a group name) | | |
| groups (groups) | | |
| name:type:member-name,member-name,member-name:comment | | |
| netobjects | (network entities) | |
| name:address/mask | | |
| protocols | (ip protocols by number) | |
| nr:name:comment | | |
| name:description:protocol-nr:source-port:destination-port | | |
| (ports can be ranges separated by a dash, e.g: 1024-65535) | | |

The Firebridge uses the following directories for it's configuration:
/usr/local/firebridge/fwconfig/active
/usr/local/firebridge/fwconfig/config Upon boot, the system will write the files, from ./active to ./config, which physically exists on the /var ram drive (symbolic link to the above name). When a user makes changes to the firewall, the changes will be recorded in the ./config directory. Once the user is satisfied with all the changes, he may then select the activate config within the management interface. The system then takes all the files from the ./config and overwrites the files in ./active. The system then starts to create ipchains compatible output translating groups into multiple rules as desired. The rules are activated in ipchains when they are successfully written. Alternatively, the user may select roll back upon which the system will take the files from ./active and overwrites the files in ./config.

I claim:

1. A network security device for controlling the flow of a packet into and out of an internal network, said network security device comprising:
   (a) a first network card;
   (b) a second network card;
   (c) a firewall comprising a packet filter; and
   (d) a third network card that is a management interface comprising a private, not publicly routed, IP address,
      (i) wherein said first and said second network cards do not have publicly routed IP addresses;
      (ii) wherein said third network card is used to configure said firewall;
      (iii) wherein during inflow of a packet, said first network card forwards said packet to said packet filter for inspection wherein said packet is compared with a first set of rules to determine whether said packet is acceptable to said internal network or is not acceptable to said internal network, wherein if said packet is acceptable to said internal network, it is forwarded to said second network card and to said internal network and if said packed is not acceptable, it is dropped and disappears;
      (iv) wherein during outflow of said packet, said packet passes through said second network card to said packet filter wherein said packet is compared with a second set of rules to determine whether said outbound packet is acceptable to said internal network or is not acceptable to said internal network, wherein if said packet is acceptable to said internal network, it is forwarded to said first network card to exit said network security device and if said packet is not acceptable to said internal network, it is dropped and disappears; and
      (v) wherein said packet filter bridges said packet after the packet is inspected.

2. The network security device of claim 1 wherein the device is connected in between a router and a hub or a server machine.

3. The network security device of claim 1 wherein the device implements independent of a separate computer.

4. The network security device of claim 1 wherein the device is configurable from an HTML interface.

5. The network security device of claim 1 wherein the device is configured with an HTML interface that is supplied with the device.

6. The network security device of claim 1 wherein the device further comprises a LOAD monitor that provides LOAD status and a graphic notification of the current load on a CPU to a user.

7. The network security device of claim 1 wherein the device further comprises a CONFIGURATION status monitor that provides a graphic notification of the commitment of changes made to the configuration of the firewall to a user.

8. The network security device of claim 1 wherein the device further comprises a monitor and log that provides a graphic indication of the allowance and denial of the packets.

9. The network security device of claim 1 wherein the device further comprises an HTML interface for configuration so that the device may be configured with any networked computer installed with an HTML browser.

10. The network security device of claim 1 wherein the first and second network cards are provided with a non-assigned IP address protocol.

* * * * *